(12) United States Patent
Chandler et al.

(10) Patent No.: US 6,592,923 B2
(45) Date of Patent: Jul. 15, 2003

(54) SYSTEM AND METHOD FOR MOLDING A SNACK CHIP

(75) Inventors: Steven Theodore Chandler, Plano, TX (US); Terry Dale Klockenga, Plano, TX (US); Daniel Eugene Orr, Dallas, TX (US); Edward Leon Ouellette, Corinth, TX (US); Richard James Ruegg, Coppell, TX (US); Alexa W. Williams, The Colony, TX (US)

(73) Assignee: Recot, Inc., Pleasanton, CA (US)

( * ) Notice: Subject to any disclaimer, the term of this patent is extended or adjusted under 35 U.S.C. 154(b) by 57 days.

(21) Appl. No.: 09/973,215

(22) Filed: Oct. 9, 2001

(65) Prior Publication Data

US 2003/0068398 A1 Apr. 10, 2003

(51) Int. Cl.[7] .............................. A23L 1/00; A23P 1/00
(52) U.S. Cl. ..................... 426/512; 99/353; 99/355; 99/427; 425/259; 425/347; 425/351; 426/280; 426/505
(58) Field of Search ................. 426/512, 280, 426/440, 496, 505; 99/353, 355, 356, 427; 425/259, 347, 351

(56) References Cited

U.S. PATENT DOCUMENTS

| | | |
|---|---|---|
| 3,812,647 A | 5/1974 | Bertling et al. |
| 3,888,363 A | 6/1975 | Erekson |
| 3,901,982 A * | 8/1975 | Griner et al. ............... 426/280 |
| 3,975,795 A | 8/1976 | Kupcikevicius |
| 3,988,875 A * | 11/1976 | Fay ............................ 99/356 |
| 4,054,015 A | 10/1977 | Rowell |
| 4,098,909 A | 7/1978 | Mims |
| 4,134,333 A | 1/1979 | Warren |
| 4,187,581 A | 2/1980 | Wagner |
| 4,194,443 A | 3/1980 | Mims |
| 4,246,290 A | 1/1981 | Haas, Sr. et al. |
| 4,614,141 A | 9/1986 | Mendenhall et al. |
| 4,622,891 A | 11/1986 | Cramer et al. |
| 4,648,237 A | 3/1987 | Total |
| H318 H | 8/1987 | Mims |
| 4,842,181 A | 6/1989 | Walser |
| 4,984,734 A | 1/1991 | Zion et al. |
| 5,078,255 A | 1/1992 | Haley |
| 5,279,096 A | 1/1994 | Mims |
| 5,279,526 A | 1/1994 | Gundlach |
| 5,303,811 A | 4/1994 | Haley |
| 5,314,056 A | 5/1994 | Davis et al. |
| 5,381,883 A | 1/1995 | Mims |
| 5,419,677 A | 5/1995 | Cohn |
| 5,507,073 A | 4/1996 | Aldridge |
| 5,630,496 A | 5/1997 | Mims |
| 5,634,549 A | 6/1997 | Mims |
| 5,641,265 A | 6/1997 | Spada et al. |
| 5,673,783 A | 10/1997 | Radant et al. |
| 5,720,593 A | 2/1998 | Pleake |
| 5,761,883 A | 6/1998 | Pruett et al. |
| 5,782,332 A | 7/1998 | Guidetti et al. |
| 5,787,687 A | 8/1998 | Mueller et al. |
| 5,794,756 A | 8/1998 | Taylor et al. |
| 5,829,954 A | 11/1998 | Pruett |
| 5,865,106 A | 2/1999 | van der Ent |
| 5,915,521 A | 6/1999 | Raque |
| 6,129,939 A | 10/2000 | Fink et al. |

\* cited by examiner

Primary Examiner—George C. Yeung
(74) Attorney, Agent, or Firm—Colin P. Cahoon; Carstens, Yee & Cahoon, L.L.P.

(57) ABSTRACT

The system and method for molding a shaped snack chip use various components to form chips having depth such as a bowl-shaped tortilla chip. Essentially flat chip preforms are fed to a series of molds disposed about a mold conveyor. The preforms are then passed along for shaping by a mold and plunger conveyor. A continuous conveyor with plungers extending outward is synchronized to operate in conjunction with the mold conveyor. At desired and determined intervals, a multiple of plungers extend downward and into the molds thereby molding the chip preforms into shaped chips. The shaped chips are evacuated from the molds and subjected to additional processing.

30 Claims, 7 Drawing Sheets

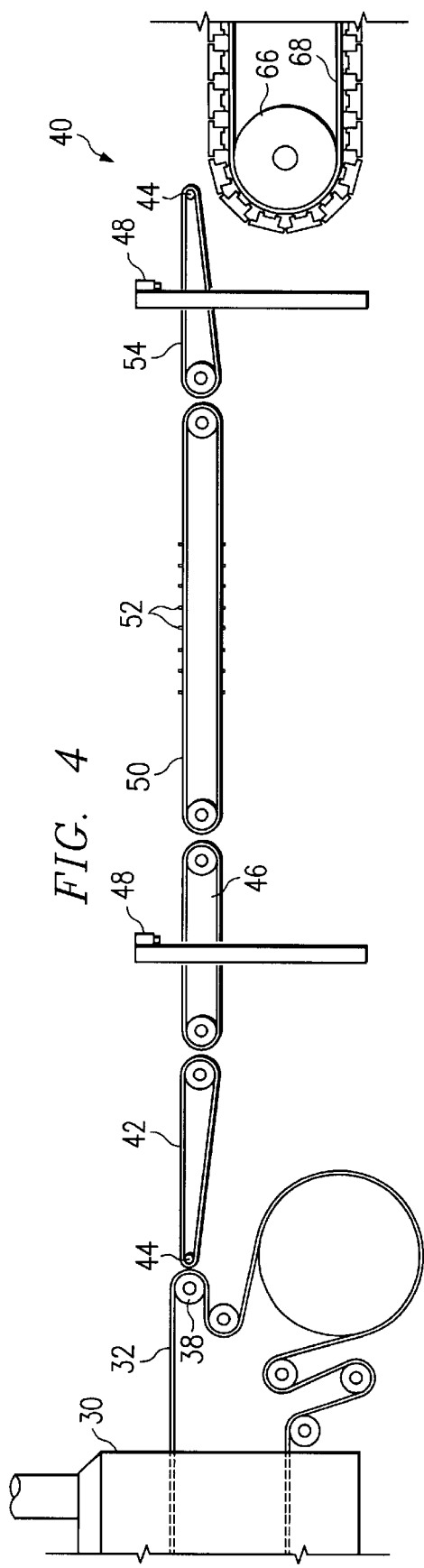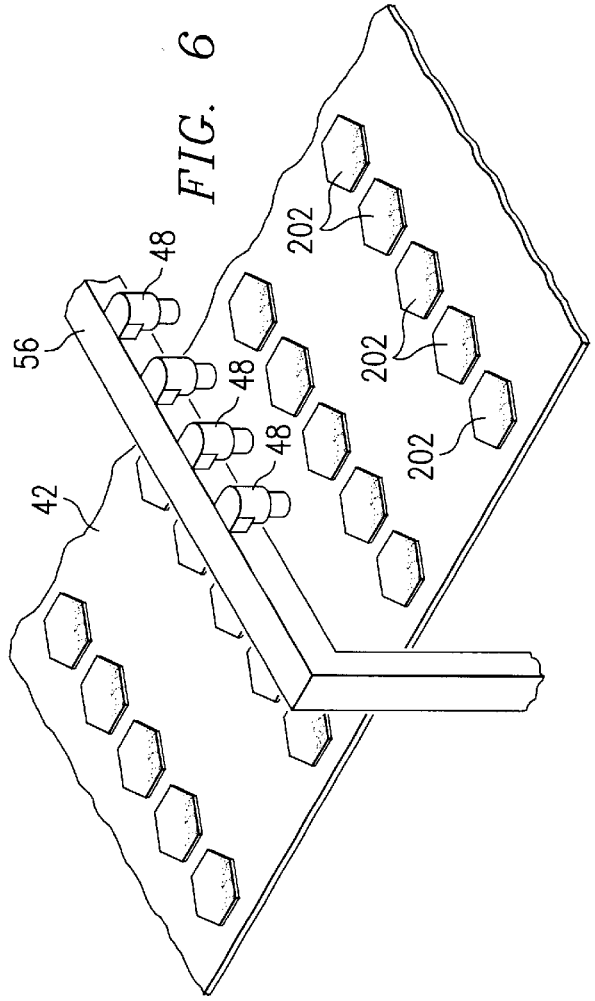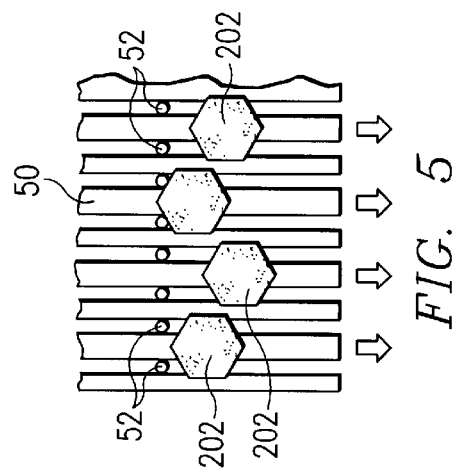

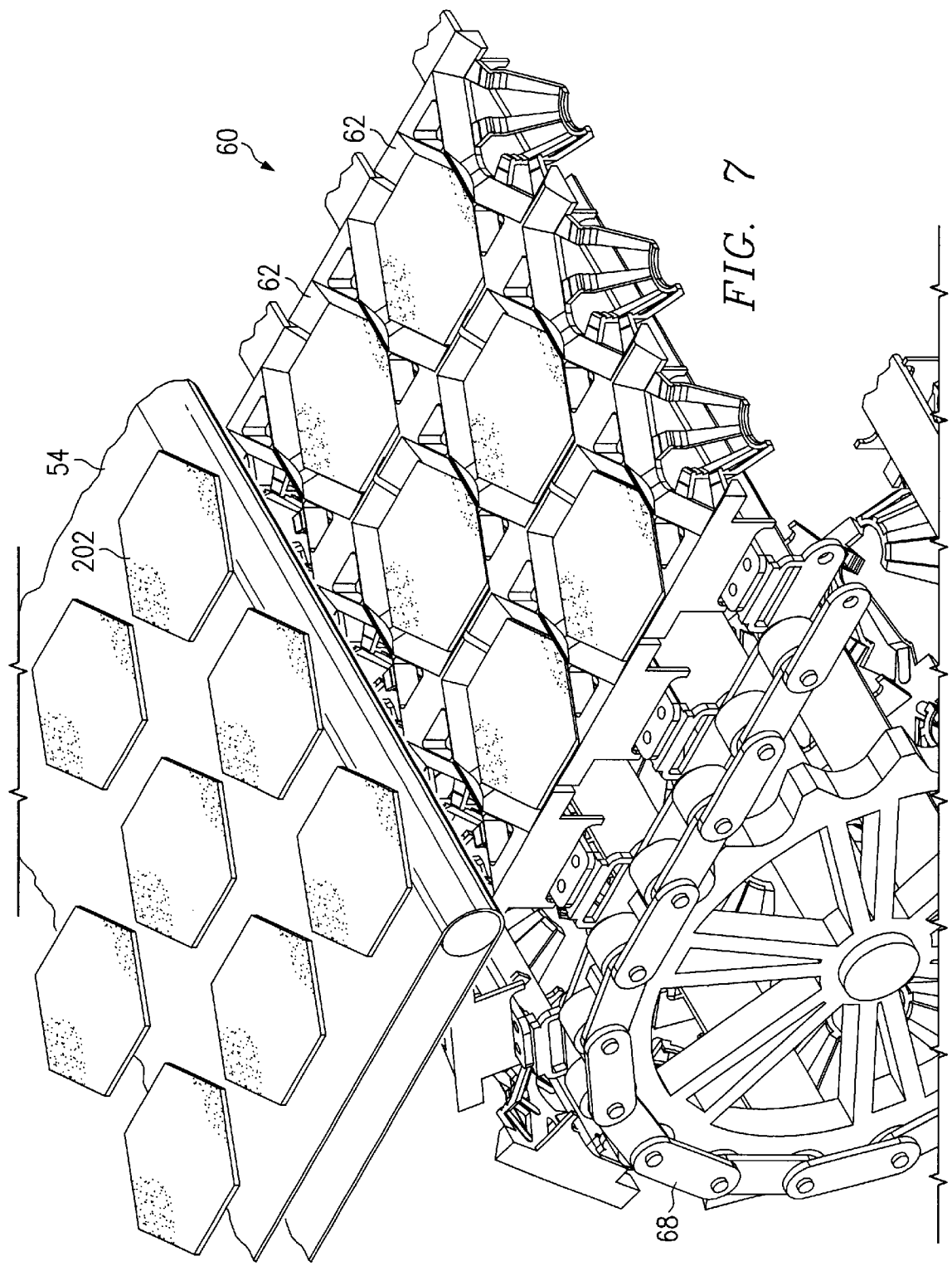

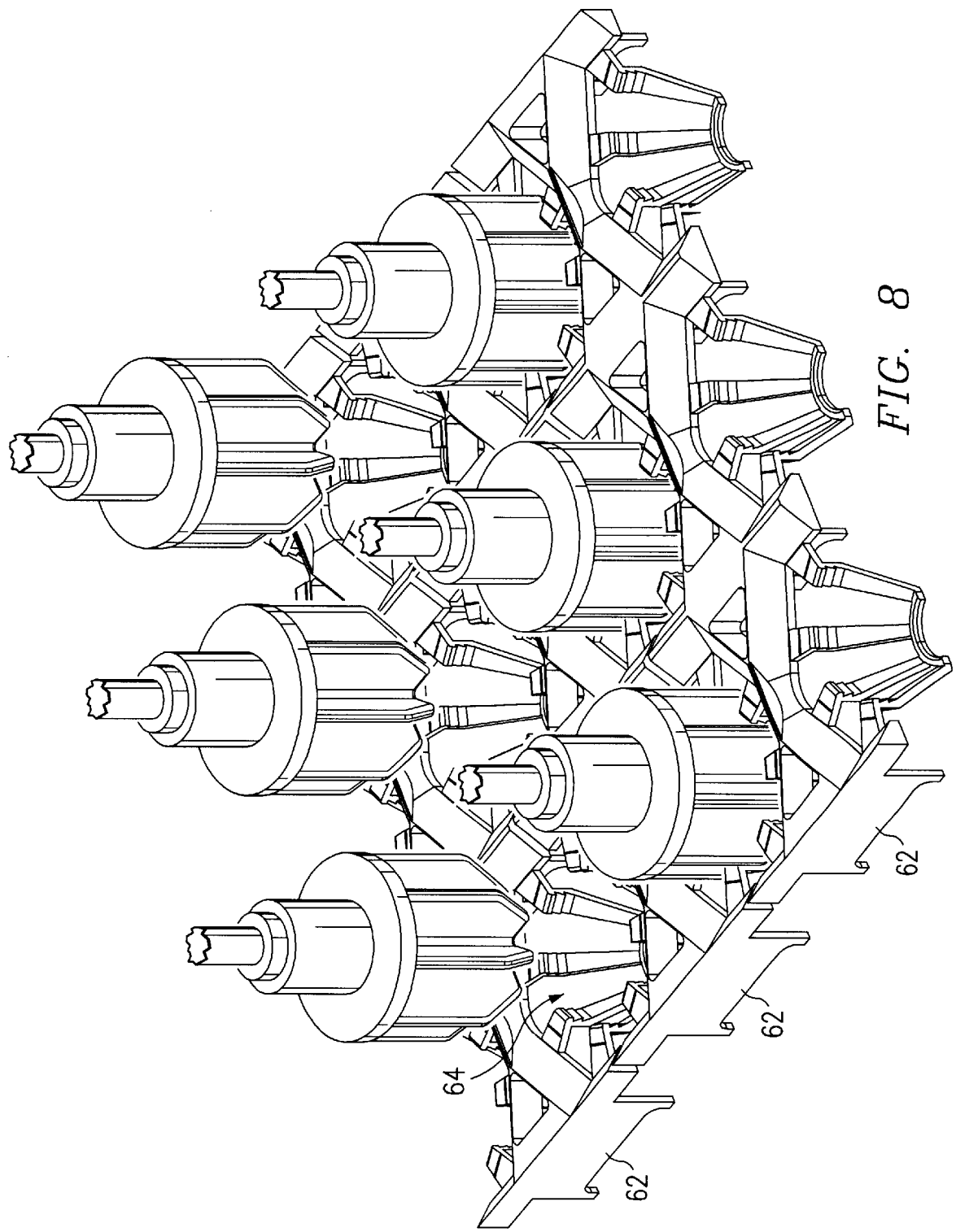

SYSTEM AND METHOD FOR MOLDING A SNACK CHIP

BACKGROUND OF THE INVENTION

1. Technical Field

The present invention relates to an improved system and method for molding a snack chip and, in particular, to a system and method for molding a scoop-shaped snack chip. The system and method allows a shaped snack chips to be molded at a relatively high production rate while producing a substantially uniform product.

2. Description of Related Art

Snack chips and other food products are frequently made to assume a desired shape. Often, these shapes are merely ornamental in design to assume an interesting shape that appeals to consumers. Sometimes, snack product shapes assume a utilitarian function. One such function is to retain liquid mixtures such as dip, salsa, bean dip, cheese dip, and the like.

When a consumer chooses to eat a chip with dip, the consumer typically holds a single chip and immerses a portion of the chip into the dip. The consumer then transfers the dipped chip to his mouth for eating. Often though, the desired quantity of dip fails to adhere sufficiently to the chip or is lost during the transfer process. This problem is particularly noticeable when the chip is flat or relatively flat. Additionally, round or triangular flat chips are often too large to insert into a jar or fail to retain a sufficient quantity of dip on the chip surface during removal of the chip from the jar. With traditional chips, some are too large to consume in one bite. When this occurs, the dip on the uneaten portion of the chip frequently slides off creating a mess and a dissatisfied consumer.

To help retain dip, snack chips have been made with curved surfaces. Shaped snack chips allow the consumer to scoop up a desired portion of dip without losing a significant quantity during transfer to the mouth for eating. Further, shaped chips are more maneuverable for insertion into ajar or can of packaged dip such as salsa. The utilitarian shapes known include for example ridges, scoops, taco-shaped, spoon-shaped, and bowl-shaped. Of these, a bowl-shaped chip is particularly desirable as it has a retaining wall or edge surrounding the entirety of the chip.

The process for making a shaped chip, especially a bowl-shaped chip, is more complex as compared to traditional flat chip manufacturing processes. With traditional chip production, the dough or masa is extruded or sheeted into a desired chip shape. The shaped chips are toasted to add some stiffness prior to frying. To equilibrate moisture, the toasted chips are passed through a proofing stage. After proofing, the chips are transferred to a fryer for dehydration of the product for consumer packaging. As the chips have a relatively flat shape, no shaping systems are needed or required after the chips are extruded or sheeted.

For making a shaped snack chip, an alternative process is shown in U.S. Pat. No. 6,129,939 to Fink et al. A form fryer produces a shaped snack chip by placing chips into a bowl-shaped mold cavity and frying the chip therein. Form frying however requires a specialized dedicated fryer where a fryer is manufactured specifically to handle the molds. A fryer such as this is more complex and has a relatively lower manufacturing capacity compared to a free fryer. A stream of hot oil is used to retain chips in the molds. A cascading oil assists in maintaining the chips in proper position. With this process, a higher oil quality is needed because the oil turnover rate is longer than the typical frying process which causes increased oil degradation over time. A higher oil quantity extends the shelf life and improves flavor of the finished chips Consequently, a system and method for forming a shaped snack chip that can operate at a high production capacity is desired. Such a system and method should be capable of producing shaped snack chips while keeping the costs associated with the chip manufacturing equipment and production with industry standards.

SUMMARY OF THE INVENTION

The present invention is an improved system and method for molding a shaped snack product such as bowl-shaped tortilla chips. The invention utilizes a sheeter for forming a sheet of dough (masa) into pieces that is fed to a toaster via a conveyor. The essentially flat shaped pieces, which for example could be hexagonal shaped pieces, are fed into one or more high temperature toasting ovens to add rigidity to the chips for the steps to follow. After toasting, the partially dried chip is conveyed to a piece alignment system. The piece alignment system aligns the chips prior to a plunger and mold conveyor system, which provides shape to the chips. The piece alignment system comprises a series of belts whereby the ranks (rows) of chips can be adjusted for proper placement for the plunger and mold conveyor. After the product is plunged in the mold conveyor, the chips pass through at least one oven for reducing chip moisture and providing additional rigidity for frying. Thereafter, the chips are ejected from the molds and are inputted into a fryer where the chips attain their final packaging moisture. Following frying, the chips are passed through an optional salter where salt and/or flavoring is added. The chips are then passed along for packaging for consumers. Particularly, the system and method are designed to have a high production rate while avoiding the use of rate limiting equipment. The above as well as additional features and advantages of the present invention will become apparent in the following written detailed description.

BRIEF DESCRIPTION OF THE DRAWINGS

FIG. 4 is a schematic elevation view of the toaster, piece alignment system, and plunger and mold conveyor portion of the system shown in FIG. 1;

FIG. 5 is a schematic plan view of the alignment belt of the piece alignment system of the system shown in FIG. 1;

FIG. 6 is a schematic perspective view of a sensor array of the piece alignment system of the system shown in FIG. 1;

FIG. 7 is a schematic perspective view of the piece alignment system and plunger and mold conveyor portion of the system shown in FIG. 1;

FIG. 8 is a schematic perspective view of the plunger and mold conveyor of the system shown in FIG. 1;

DETAILED DESCRIPTION

Figure 1:
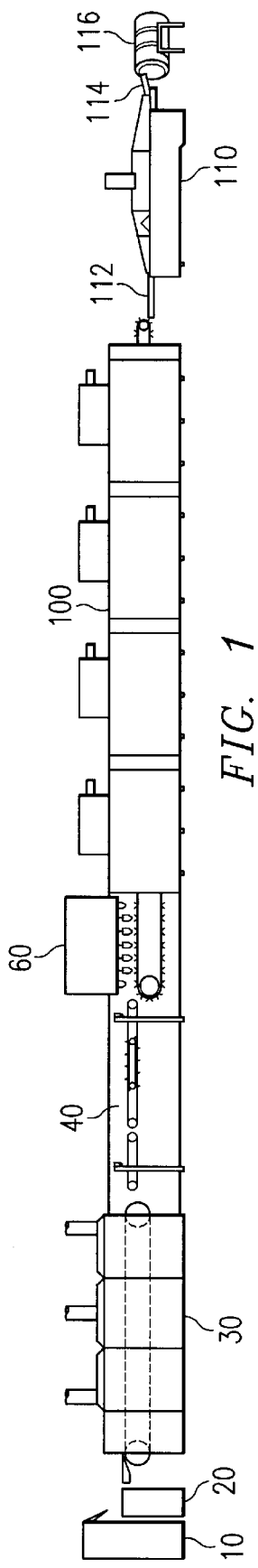
FIG. 1 is a schematic perspective view of a system for making shaped snack products.
Figure 2:
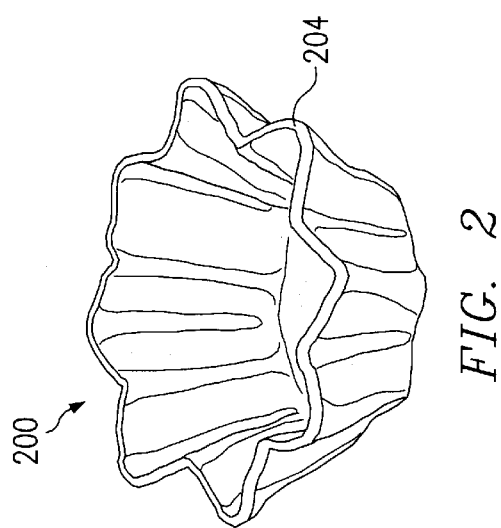
FIG. 2 is a side elevation view of a shaped snack chip produced in accordance with the invention.

In FIG. 1, a process for forming a shaped snack chip is shown. Sheeter 10 forms a sheet of dough that is fed to toaster 30 via conveyor 20. Conveyor 20 transfers the essentially flat shaped raw chips, which for example are hexagonal shaped chips. The flat shaped dough or chip is then fed into a high temperature toasting oven 30 for adding rigidity for the following steps. The partially dried chip is then fed to a piece alignment system 40. The piece alignment system 40 aligns the product for feeding to a plunger and mold conveyor 60. Plunger and mold conveyor 60 imparts a shape to the chips. After the product is plunged to the mold shape, the chips pass through a multizone dryer 100 for reducing chip moisture. Thereafter, the chips are ejected from the molds and are fed into a fryer 110 where the chips attain their final packaging moisture. Following frying, the chips are passed through an optional salting drum 116 where salt and/or flavoring is added. Thereafter, chips 200 shown in FIG. 2, are passed along for packaging for consumers.

In one embodiment, sheeter 10 has sheeter rollers and a conveyor 20 mounted in a common frame as a single unit (not shown). Sheeter 10 receives the dough at an inlet. The dough can be comprised of corn, wheat, rice, or other grains and mixtures thereof. For the preferred embodiment, the dough is comprised of white dent corn. As the sheet is formed in sheeter 10, a cutter within sheeter 10 having the initial chip shape, which for example is an essentially flat hexagon, is provided. As dough passes by a cutter within sheeter 10, the initial chip shape is formed so that essentially flat chips 202 being produced have approximately the same shape and thickness upon exiting sheeter 10. Chips 202 are conveyed over conveyor 20 towards toaster 30. Optionally, conveyor 20 has a pneumatic lift system to raise the conveyor to provide access to toaster 30 as needed. This is beneficial because as formed product exits sheeter 10 the product essentially drops a small distance onto conveyor 20. As the physical properties of the product being sheeted may change such as the coarseness and particle size of the dough, the adhesive properties, and the moisture content, the ability to adjust this drop is beneficial to maintain product uniformity.

After the dough is sheeted into the chip product's initial shape, chips 202 are fed to toaster 30 for reducing the product moisture. Using a preferred dough of masa, the chip moisture leaving the sheeter is typically about 50 to about 52% and is reduced to about 30 to about 40%, more preferably about 37%, by toaster 30. Chips 202 are dropped onto a rotating transfer belt 32 for passage through toaster 30. Toaster 30 toasts chips 202 through heating with infrared (IR), radio frequency, convective, ribbon burners, direct gas fired, conductive, impingement, and microwave heating for example. In a preferred embodiment, a series of IR burners or direct flame belt heaters are used. After toasting, chips 202 are transported to piece alignment system 40.

Figure 3:
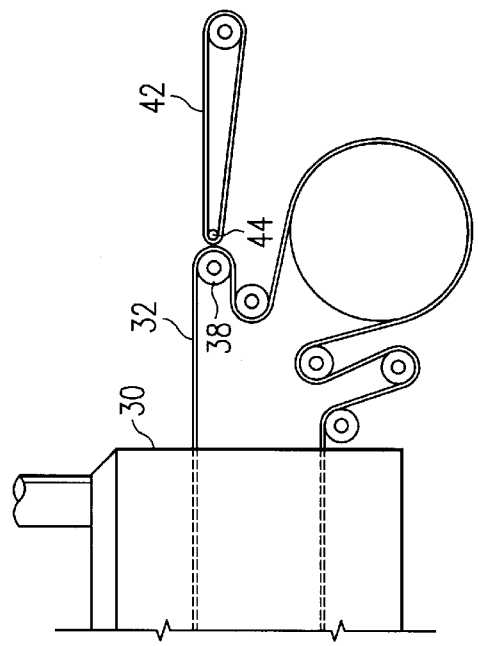
FIG. 3 is a schematic side elevation view of the toaster and piece alignment system portion of the system shown in FIG. 1.

Preferably, the product coming forth from toaster 30 just prior to a piece alignment system 40 utilizes a bladeless transfer shown in FIGS. 3 and 4. Unlike with a bladed transfer, a bladeless transfer avoids having multiple chips adhering to the blade due to sticky residue buildup thereon, nicks in the blade from high force contact with the toaster oven belt, blade replacement, or the blade losing contact with the belt causing chips to be captured between the blade and toaster oven belt. With the bladeless transfer, a monolayer of product leaving toaster 30 is maintained more readily than with using a conventional blade assisted transfer, i.e., a doctor blade. The blade assisted transfer does not require precise spatial orientation because a doctor blade is not practical for a molding process. To achieve bladeless transfer, the terminal end of toaster oven belt 32 has a discharge roll 38 that is disposed higher than a transfer belt 42, about 0.2 to about 0.5 inches higher. The leading edges of the toasted chips 202 essentially lift off of toast oven belt 32 at discharge roll 38 and convey onto transfer belt 42 at a nosebar roll 44.

FIGS. 3 and 4 show transfer belt 42 which is the first of several belts of the piece alignment system 40. The speed of transfer belt 42 operates at essentially the same rate as belt 32 to facilitate the bladeless transfer. With the product essentially aligned as a monolayer of partially dried chips 202, these chips 202 are transferred to a phasing belt 46. Phasing belt 46 has an adjustable speed for transferring chips 202 from the speed on transfer belt 42 to the speed and position needed for mold alignment belt 50. Once at proper speed, the product is fed to alignment belt 50.

With alignment belt 50, the chips are aligned by rank (rows) and file (columns) for eventual feeding to a plunger and mold conveyor 60. Alignment belt 50 has a system for conveying the chips into essentially even ranks. Although the chips entering alignment belt 50 have essentially distinct and even files, the ranks are not sufficiently aligned for eventual feeding to the plunger and mold conveyor 60. Therefore in one embodiment, alignment belt 50 is outfitted with a series of cleats 52 that extend upwards from alignment belt 50 as shown in FIG. 5. These cleats 52 are moving slightly faster than alignment belt 50 and are traveling on a cleat conveyor (not shown) disposed beneath alignment belt 50.

As such, most chips are eventually pushed along the moving alignment belt 50 so that at the exiting from alignment belt 50 the chips have essentially even ranks. To maintain even files, it is preferable that at least two cleats 52 be provided per chip 202. Thereby, a trailing edge of chip 202 will end up disposed between at least two cleats 52. To catch each chip 202, the distance between two cleats 52 in a rank is smaller than the width of the chip. Upon exiting alignment belt 50, chips 202 are deposited on a discharge belt 54 for transfer to mold belt 68 of plunger and mold conveyor 60.

To ensure that the majority of chips 202 passing onwards to the plunger and mold conveyor 60 are in proper alignment, a position control system is utilized with piece alignment system 40. Further the control system is used to insure that chips 202 are deposited onto alignment belt 50 such that chips 202 will be between rows of cleats 52. The control system compensates for the differences of the incoming speed of chips 202 being fed into the piece alignment system 40 and the positioning needed for the plunger and mold conveyor 60. If not positioned properly within a determined acceptable range for the plunger and mold conveyor 60, then a number of chips 202 will not be positioned properly into the molds of the plunger and mold conveyor 60.

Therefore, a chip sensor 48 is positioned to operate in conjunction with piece alignment system 40. In a preferred embodiment, chip sensor 48 is positioned above phasing belt 46 and/or discharge belt 54. However, chip sensor 48 can be positioned at a number of locations along the system for forming a shaped snack chip 202. An optical sensor such as a photocell array can detect chips 202 to effectively determine their relative position. Other sensors can be employed however such as laser, ultrasonic, cameras, and color contrast.

The control system uses the information gathered from chip sensor 48 to determine the average rank position of chips 202 as to whether chips 202 are approaching on target, too early, or too late. Based upon this average computed position, an adjustment to the overall system is made if needed to insure that piece alignment system 40 is delivering essentially uniform ranks of chips to plunger and mold conveyor 60. To adjust the positioning of the chips, the control system could optionally adjust one or more of the speeds of transfer belt 42, phasing belt 46, cleats 52, and/or discharge belt 54 for optimal chip delivery to plunger and mold conveyor 60. As to positioning of the sensor, chip sensor 48 could be situated above transfer belt 42, phasing belt 46, alignment belt 50 at the chip entry, and/or discharge belt 54.

For example, a photocell array 56, utilizing chip sensors 48, is arranged to measure the front wall of the passing chips 202 as they pass on phasing belt 46 as shown in FIG. 6. The first and last files of these are typically not measured because these end chips 202 tend to accumulate scrap material from upstream processing. Sensing the remaining chips 202, the average position of chips 202 in that rank can be determined. The speed of phasing belt 46 is then adjusted if necessary to assure that the following ranks of chips 202 will be fed to plunger and mold conveyor 60 at the proper speed to assure maximum alignment of chips 202 being deposited onto molds 64.

FIG. 7 shows plunger and mold conveyor 60 receiving the flat chips 202. With a preferred dough of masa, the moisture of chips 202 is at approximately the same moisture as upon their departure from toaster 30, about 34 to about 40%. At this moisture, the chips have enough cohesive integrity for molding.

Chips 202 are passed from discharge belt 54 to mold racks 62. Ranks of mold racks 62 are comprised of a series of connected individual chip molds 64 for imparting the desired shape to each chip 202. With proper sequencing, each mold 64 receives a chip properly aligned from piece alignment system 40. Although molds 64 can be of any practical shape for a snack chip, molds 64 preferably have a bowl-shape.

Figure 9:
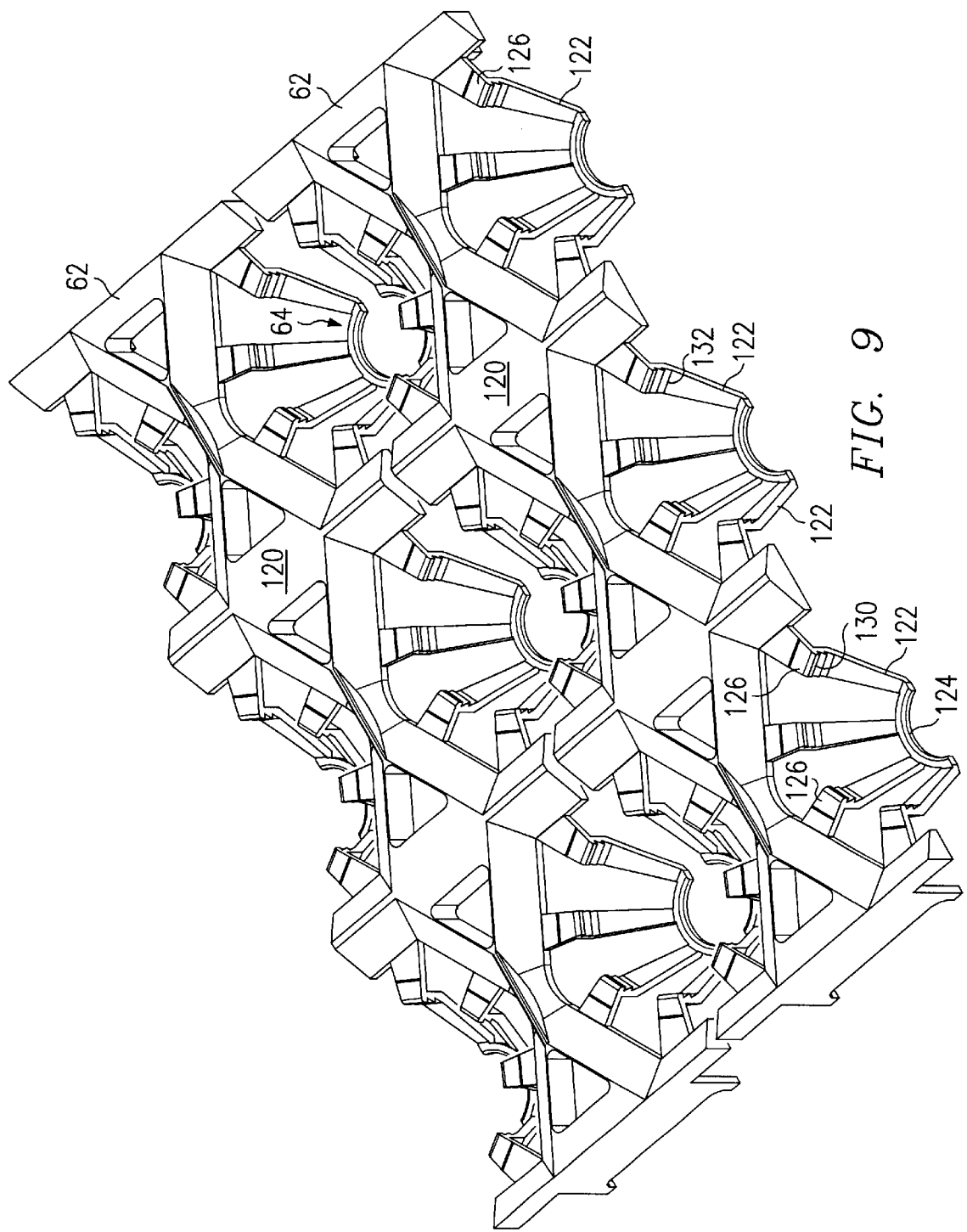
FIG. 9 is a schematic perspective view of mold racks in accordance with the invention.

FIGS. 8 and 9 show molds 64 that are formed by the juxtaposition of two mold racks 62. Each mold rack 62 has a series of halves of molds 64 positioned along in ranks. Ranks of mold racks 62 travel continuously about mold belt 68. Mold belt 68 is timed to ensure that mold racks 62 are properly positioned for receiving the chips into molds 64 and for plunging. For example, a servo driver can properly control the timing of mold racks 62. In a preferred embodiment, mold belt 68 is a continuous chain belt disposed around rolls as shown in FIG. 7. As mold racks 62 begin to travel upwards around roll 66, the top portions of mold racks 62 begin to separate apart due to the physics of having rectangular-like mold racks 62 traveling about a roll. As mold racks 62 reach the top of mold belt 68, the top portions of mold racks 62 close together thereby forming molds 64. To release chips 200, molds 64 open and separate to allow the chips to continue towards fryer 110. In a preferred embodiment, multiples of mold racks 62 positioned perpendicularly to the direction of longitudinal motion of mold belt 68. For example, 6 mold racks 62 could be disposed inline perpendicularly to the direction of longitudinal motion of mold belt 68. As depicted, one mold rack 62 when adjoined with another mold rack 62 form 3 molds 64. If positioned inline across mold belt 68, ranks of 18 chips 202 can be processed simultaneously if 6 mold racks 62 are positioned per rank.

As shown in FIG. 8, molds 64 have a bowl-shape. Other shapes are possible however such taco, oval taco, hexagonal taco, round saucer, canoe, spoon, oval, round, and more. Molds 64 are preferably only semi-enclosed in order to maximize the exposed surface area of the chip as it is further dried in dryers 100. Mold racks 62 contain a number of halves of molds 64 such that the juxtaposition of two mold racks 62 on mold belt 68 forms full molds 64. In the embodiment shown, six halves are disposed within a single mold rack 62 in a rectangular three by two scheme although other schemes are possible. Each half of mold 64 has its closed end towards the middle of mold rack 62. Linking the mold halves together on mold rack 62 is a mold rack support structure 120. As depicted in a preferred embodiment, mold rack support structure 120 is a solid mesh structure. This allows now molded chips 200 disposed in mold racks 62 to exposed to a greater amount of air and heat in dryers 100 as compared to a solid mold rack. Also, less material is required to form mold rack 62 which reduces costs and weight. Typically, mold racks 62 can be formed from any moldable, heat resistant material such as plastic and metal. In the preferred embodiment, mold racks 62 and, therefore, molds 64 are made from stainless steel.

FIG. 9 shows a cross section view of a preferred embodiment of mold 64. Mold rack support structure 120 confines each mold 64. Within mold 64, depending support arms 122 extend from support structure 120 downward and inward towards the center of mold 64 to affix to a bottom edge support 124. Bottom edge support 124 forms a partially open ring to support the shaped snack chip 200. At a top portion of depending support arm 122, a plateau edge 126 provides a resting surface for flat chips 202 yet to be plunged. When flat chip 202 is initially deposited into mold 64, plateau edges 126 support chip 202 over the open space of mold 64. To help retain chip 202 within mold 62, one or more barbs or beveled edges can be provided. As shown, optional upper and lower barbs 130 and 132 are disposed towards the top portion of the each depending support arm 122. Once the chip 202 is pressed into mold 64, the top edge will likely abut barbs 130 or 132 on several of depending support arms 122. As chip 202 is stamped into a mold 64, it assumes the mold's shape to form chip 200, which is a bowl-shape as shown in FIG. 2. Additionally, the chips can be given additional features of shape by modifying the shape of plunger inserts 80. Should a chip 202 be misaligned and not completely inserted into mold 64 by a plunger insert 80, the resulting chip produced will still generally have a scoop or bowl shape, although possibly not centered. This is because a portion of chip 202 will still be contacted by plunger insert 80. The portion of chip 202 contacted is forced into mold 64 which thereby produces a shaped chip 200.

To reduce the loss of chips not deposited into a mold 64, an optional feature of retaining chips can be provided. Fingers (not shown) can be provided to prevent a vertically oriented chip 202 from falling through the space between two mold racks 62 should a chip 202 not land into a mold 64. These fingers are attached to the base portion of mold rack 62 around bottom edge support 124 to extend between mold racks 62. Thereby, the fingers will support any vertical chips 202 as it travels along plunger and mold conveyor 60 and dryer 100. While these chips will not be plunged, they are retained to increase the product yield.

Figure 10:
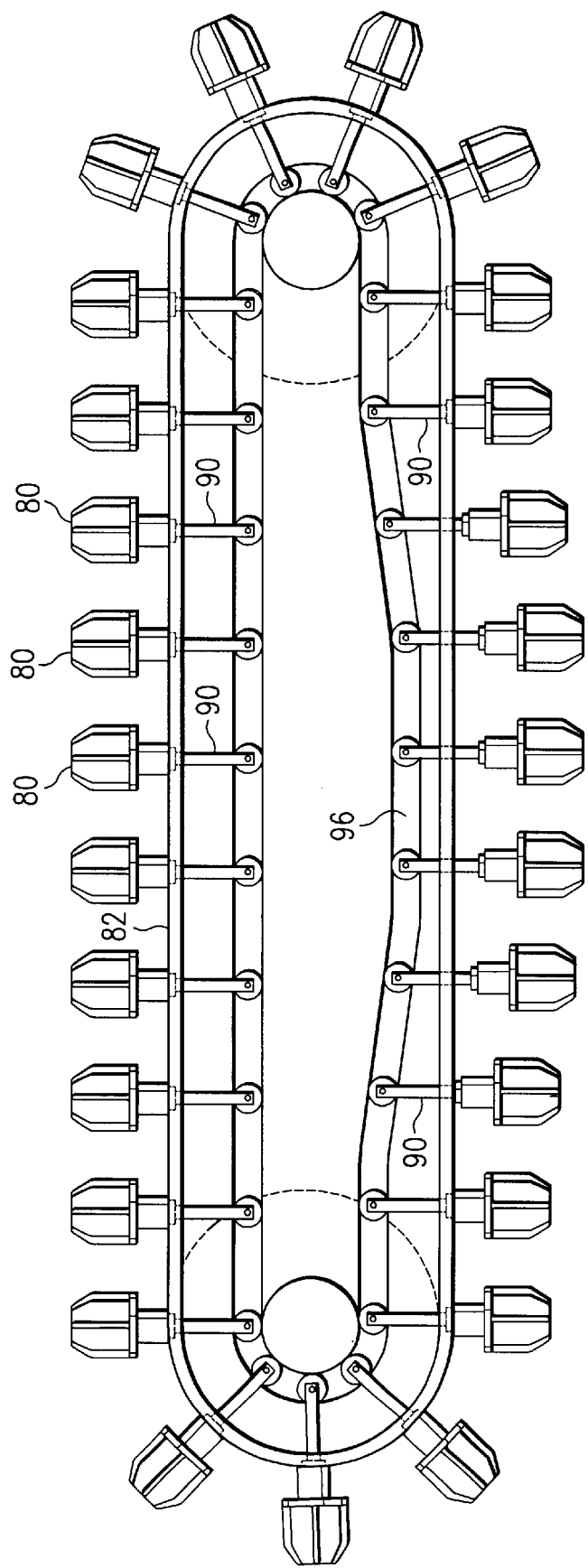
FIG. 10 is a schematic elevation view of a plunger belt in accordance with the present invention.

FIG. 10 shows plunger inserts 80 disposed along plunger belt 82 of plunger mold conveyor 60. Plunger inserts 80 are typically comprised of a moldable material such as silicone, rubber, plastic, or metal. Softer materials such as silicone, rubber, or plastic are preferred. Insuring that plunger inserts 80 will be aligned above the corresponding opening of mold 64, mold racks 62 and plungers 80 are carried longitudinally along on mold rack belt 68 and plunger belt 82, respectively, and are synchronized to operate together. Once chip 202 is disposed properly on mold 64 at plateau edges 126, a plunger insert 80 extends downward pushing chip 202 into mold 64. In operation, an individual plunger insert 80 extends into mold 64 for less than one second, generally only about 0.4 seconds. By minimizing the time that plunger insert 80 extends into mold 64 reduces the likelihood of product shearing effects caused from mechanical wear and thermal expansion. Further, minimizing the time reduces the amount of misalignment between plunger insert 80 and mold 64.

Figure 12:
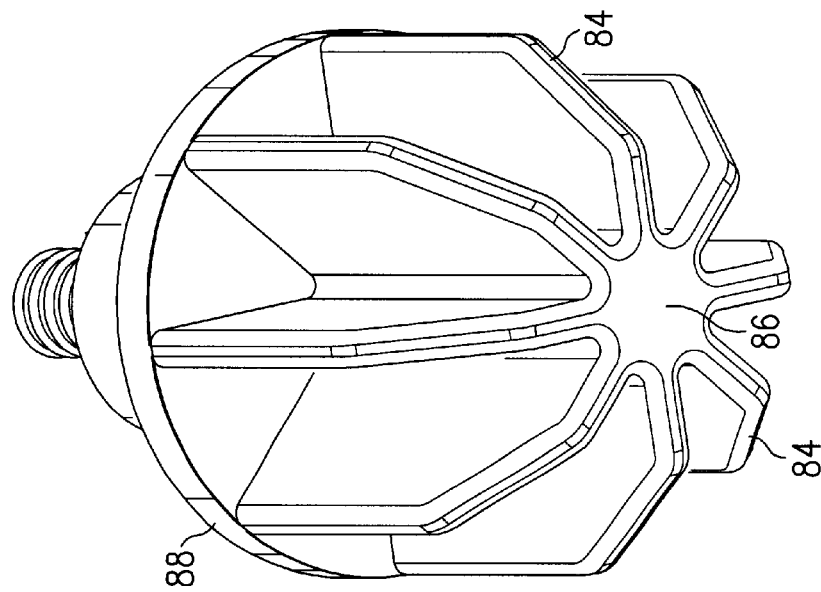
FIG. 12 is a schematic perspective bottom view of a plunger in accordance with the present invention.
Figure 11:
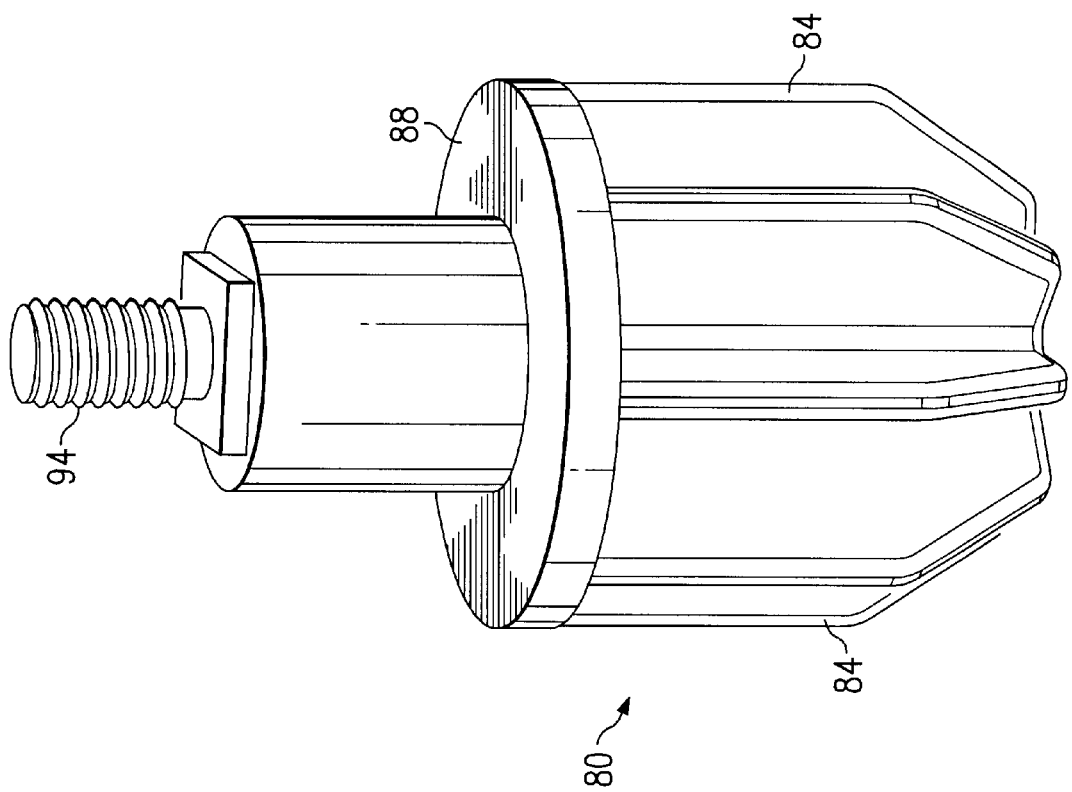
FIG. 11 is a schematic perspective side view of a plunger in accordance with the present invention.

FIG. 11 plunger insert 80 has eight fluted edges 84 extending outward from the plunger insert's central support rod 86. Fluted edges 84 provides ridges to the chip. With eight fluted edges, molded chip 200 will comprise an essentially octagonal shape after being plunged. In other words, each chip will have eight fluted edges. While plunger insert 80 is shown having eight fluted edges, other quantities of fluted edges are possible depending on the shape of the chip desired. The fluted edges 84 extend from a bottom portion of plunger insert 80 upward towards flange 88 shown clearly in FIG. 12. Flange 88 is disc shaped and is essentially parallel to plunger belt 82 in operation. The diameter of flange 88 is approximately equal to the inner width of mold 64. Further, flange 88 extend outward from support rod 86 to approximate the inner width of mold 64. As shown, fluted edges 84 extend from flange 88 downward towards the bottom of support rod 86. The bottom periphery of flange, shown in FIG. 12, approximates that of mold 64 while a top portion does not and extends linearly to provide fluted edges 204 to formed chips 200. Fluted edges 204 allow for a point of entry and easier dipping of the finished chip in addition to providing a aesthetic appearance. Above flange 88, support rod 86 protrudes upward with plunger mating adapter 94. Plunger mating adapter 94 provides for the connection of plunger insert 80 to plunger belt 82. In one embodiment, plunger mating adapter 94 is a screw bolt which is received by a plunger platform 90 that is affixed to plunger belt 82.

Plunger belt 82 rotates above and at the same speed as mold belt 68 for suitable plunging and molding of shaped snack chips 200. As plunger inserts 80 rotate around on plunger belt 82, plunger inserts 80 are pressed into molds 64 at desired intervals to a sufficient depth to push chip preform 202 into the mold to form shaped snack chip 200. For appropriate timing, plunger belt 82 preferably uses a link conveyor arrangement. However, other arrangements are possible such as a walking beam or air piston plungers. With the conveyor arrangement, the plunger belt 82 is driven by a mechanical linkage powered by a support chain connected to mold belt 68. As a set of plungers 80 rotates towards the desired interval of plunging, a cam mechanism is depressed causing one or more sets of plungers into corresponding molds 64 in a vertical motion. To actuate the cam mechanism, a plunger actuator assembly 96 is provided. After a brief interval, the tension on the cam is released which thereby releases plungers 80 upward and out of molds 64. In application, two rows of plungers are retained per plunger platform 90. By having two or more rows per plunger platform 90, the number of mechanical components is reduced and the structural integrity is improved.

Once plunging is complete and chips 200 are passed through plunger and mold conveyor 60, chips 200 are conducted through a form dryer 100 while still retained within molds. Form dryer 100 is optionally a multizone dryer with four zones that reduces chips 200 down to a desired moisture content so that chips 200 will retain their shape after being ejected from molds 64 into fryer 110. With a preferred dough of masa, the moisture of chips 200 after passing through form dryer 100 will be reduced to between about 23 to about 28%. Dryer 100 are hot air impingement ovens that utilize hot forced air. Other forms of drying however may be used such as infrared, microwave, or radio frequency. Optionally, a vacuum is provided from beneath mold belt 68 within form dryer 100 to aid in drying the chips. With the open structure of mold racks 62, a relatively large surface area of chips 200 be exposed to the drying currents. In the preferred embodiment, drying is provided at a temperature of about 300 to about 400° F. The chips are reduced from an inlet moisture of about 34 to about 38% to an outlet moisture of about 23 to about 28%. At the end of the form dryers 100, chips 200 are separated from molds 64 onto a fryer feed belt 112.

To release chips 200, molds 64 open and separate to allow the chips to continue towards fryer 110. To assist the release of chips 200, an air blower beneath mold rack belt 68 can direct a stream of air or other inert fluid towards the bottoms of molds 64. Since molds 64 are designed to be partially permeable, the air current will push chip 200 from the mold in addition to gravity. The shaped chips 200 are directed onto a fryer feed belt 112 and then into a fryer 110 containing oil.

Fryer 110 is used to bring the product to its final dryness for consumer packaging and to add flavor. With a preferred dough of masa, the chip moisture upon entering fryer 110 is about 20 to about 24%. After frying, chip 200 has a moisture content of about 0.8 to about 1.3%, more preferably about 1.1%. Also, the oil content of chip 200 is about 23 to about 25%, more preferably about 24%. The process of frying chips 200 involves feeding chips 202 from belt 112 into fryer 110. Chips 200 are fed into fryer 110 in a random packing order whereby free-frying occurs. After free-frying, chips 200 are introduced into a paddle section for transferring to a submerger for deeper packing of chips. For evacuating chips 200 from the submerger section, multiple cascading conveyors hoist chip 200 out of the oil. Thereby, chips 200 drain any residual oil from any crevices in chips 200 as they are passed from one conveyor to the next. Chips 200 are then placed onto a fryer discharge belt 114 for feeding to an optional drum 116 or to packaging. Rotating drum 116 provides any salting and/or flavoring that is desired. Thereafter, shaped chips 200 are sent to product packaging.

Consequently, a system and method for forming a shaped snack chip that can operate at a high production capacity are desired. Such a system and method should be capable of producing shaped snack chips while keeping the costs associated with the chip manufacturing equipment and the maintenance of the chip production relatively low The present system and method form shaped snack chips inexpensively and more efficiently at a relatively high production rate compared to prior art systems. The present invention is superior in making a shaped snack chip because costly form-frying in molds is avoided. Additionally, shaped snack chips are made more efficiently because of reduced maintenance needs compared to prior systems. This results in producing a shaped snack chip having a desired utilitarian shape useful for scooping and retaining liquid mixtures such as dips and other toppings on the chip.

While the invention has been particularly shown and described with reference to a preferred embodiment, it will be understood by those skilled in the art that changes in form and detail may be made therein without departing from the spirit and scope of the invention.

What is claimed is:

1. A system for molding a snack chip, comprises:

a supply belt supplying essentially flat chip preforms;

a mold belt having molds disposed about a length of the mold belt for receiving and processing the chip preforms;

a plunger assembly having plungers disposed across a length of the plunger assembly facing the molds wherein the plunger assembly is positioned above and operated with the mold belt; and a plunging arrangement operable to extend the plungers into the molds thereby molding the essentially flat chip preforms into shaped snack chips.

2. The system of claim 1 wherein the plunger assembly comprises a plunger belt across which the plungers are disposed and that is operated synchronously with the mold belt.

3. The system of claim 1 wherein the mold belt comprises a belt having mold racks disposed about its surface wherein a juxtaposition of at least two mold racks forms the molds.

4. The system of claim 3 wherein one of the mold racks-comprises a multiplicity of half molds supported by a mold rack support structure.

5. The system of claim 4 wherein the one mold rack has a rectangular shape with at least two half molds disposed on two opposing sides of the one mold rack.

6. The system of claim 1 wherein at least one of the molds comprises a multiplicity of support arms depending from a mold rack support structure downward to a bottom edge support whereby the multiplicity of support arms form a partially open matrix for retaining the chip during molding.

7. The system of claim 6 wherein each support arm further comprises a plateau edge at a top portion of the support arm for retaining the chip preform prior to molding, and one or more barbs disposed on the support arm for retaining the chip within the mold after molding.

8. The system of claim 1 wherein the plunging arrangement further comprises an actuator assembly operable to cause one or more ranks of plungers to move downward and into corresponding molds having chip preforms resting on plateau edges of the molds.

9. The system of claim 1 wherein each plunger comprises a support rod depending from the plunger assembly, and a plunger insert extending from the support rod wherein the plunger insert is adapted for extending into a mold for molding the chip preform into a shaped snack chip.

10. The system of claim 9 wherein the plunger insert has a multiplicity of fluted edges extending outward from the support rod for providing edging to the shaped snack chips.

11. The system of claim 1 further comprising a dryer positioned to receive the shaped snack chips while retained in the molds.

12. The system of claim 11 wherein the dryer comprises one or more air impingement ovens.

13. The system of claim 11 further comprising a means for ejecting molded and heated shaped snack chips from the molds.

14. The system of claim 13 wherein the means for ejecting further comprises ejecting the shaped snack chips from the molds by having the molds, which are supported by mold racks disposed on the mold belt, open and separate as the molds pass over a discharge roll supporting the mold belt.

15. The system of claim 14 wherein the means for ejecting is further aided by an air blower positioned beneath the molds as the molds pass over the discharge roll.

16. The system of claim 1 wherein at least one of the molds has a bowl shape.

17. The system of claim 10 wherein at least one of the molds has a bowl-shape.

18. A method for molding a snack chip, comprising:

supplying essentially flat chip preforms with a supply belt to molds disposed about a length of a mold belt;

operating a plunger assembly above the mold belt wherein the plunger assembly has plungers disposed across a length of the plunger assembly facing the molds; and molding the chip preforms by extending the plungers into the molds thereby forming shaped snack chips.

19. The method of claim 18 wherein the operating of the plunger assembly further comprises operating a plunger belt synchronously with the mold belt, the plunger belt and mold belt having an equal number of plungers and molds across each rank.

20. The method of claim 19 further comprising forming molds by a juxtaposition of at least two mold racks, the mold racks disposed about a surface of the mold belt.

21. The method of claim 18 wherein the supplying of the chip preforms further comprises depositing the chip preforms onto a plateau edge disposed about the periphery of the top of each mold, the plateau edge supporting the chip preforms prior to molding.

22. The method of claim 21 wherein operating the plunger assembly further comprises plunging the chip preforms supported on the plateau edges of the molds with the plungers to form shaped snack chips.

23. The method of claim 22 wherein the plunging further comprises providing a multiplicity of fluted edges to the shaped snack chips by supplying fluted edges to the plungers.

24. The method of claim 18 further comprising heating molded snack chips while retained in the molds after molding the chip preforms.

25. The method of claim 24 further comprising ejecting the molded snack chips from the molds after heating by having the molds, which are supported by mold racks disposed on the mold belt, open and separate as the molds pass over a discharge roll supporting the mold belt.

26. The method of claim 25 wherein the ejecting further comprises using an air blower positioned beneath the molds as the molds pass over the discharge roll.

27. The system of claim 9 wherein each support rod depends from a plunger belt of the plunger assembly.

28. The method of claim wherein the supplying further comprises supplying essentially flat chip preforms made of masa.

29. The method of claim 18 wherein the molding of the chip preforms comprises actuating a cam mechanism causing the plungers to extend into the molds thereby forming shaped snack chips.

30. The method of claim 21 wherein the operating of the plunger assembly further comprises actuating a can mechanism causing the plungers to plunge into the chip preforms supported on the plateau edge of each mold.

* * * * *

UNITED STATES PATENT AND TRADEMARK OFFICE
CERTIFICATE OF CORRECTION

PATENT NO. : 6,592,923 B2  Page 1 of 1
DATED : July 15, 2003
INVENTOR(S) : Chandler et al.

It is certified that error appears in the above-identified patent and that said Letters Patent is hereby corrected as shown below:

Column 9,
Lines 8-9, delete "performs" and insert -- preforms --

Column 10,
Line 52, delete "claim wherein" and insert -- claim 18 wherein --
Line 60, delete "can" and insert -- cam --

Signed and Sealed this

Seventeenth Day of February, 2004

JON W. DUDAS
*Acting Director of the United States Patent and Trademark Office*